US011952938B2

(12) United States Patent
D'Epiro et al.

(10) Patent No.: US 11,952,938 B2
(45) Date of Patent: Apr. 9, 2024

(54) SPLIT CYCLE INTERNAL COMBUSTION ENGINE

(71) Applicant: FPT INDUSTRIAL S.P.A., Turin (IT)

(72) Inventors: Clino D'Epiro, Turin (IT); Pierangelo Feola, Turin (IT); Giuseppe Cereda, Turin (IT); Marco Rocchini, Turin (IT)

(73) Assignee: FPT INDUSTRIAL S.P.A., Turin (IT)

( * ) Notice: Subject to any disclaimer, the term of this patent is extended or adjusted under 35 U.S.C. 154(b) by 0 days.

(21) Appl. No.: 18/040,830

(22) PCT Filed: Aug. 2, 2021

(86) PCT No.: PCT/IB2021/057050
§ 371 (c)(1),
(2) Date: Feb. 7, 2023

(87) PCT Pub. No.: WO2022/034430
PCT Pub. Date: Feb. 17, 2022

(65) Prior Publication Data
US 2023/0296045 A1  Sep. 21, 2023

(30) Foreign Application Priority Data

Aug. 13, 2020 (IT) .................. 102020000020140

(51) Int. Cl.
*F02B 33/22* (2006.01)
*F02B 29/04* (2006.01)
(Continued)

(52) U.S. Cl.
CPC .......... *F02B 33/22* (2013.01); *F02B 29/0418* (2013.01); *F02B 29/0481* (2013.01);
(Continued)

(58) Field of Classification Search
CPC ...... F02B 33/06; F02B 33/22; F02B 29/0418; F02B 29/0481; F02B 75/02;
(Continued)

(56) References Cited

U.S. PATENT DOCUMENTS 5,103,645 A * 4/1992 Haring .................... F02B 41/06
123/68
7,434,551 B2 * 10/2008 Zajac ...................... F02B 41/06
123/70 R (Continued)

FOREIGN PATENT DOCUMENTS

EP        0463818 A1    1/1992
EP        2131023 A2   12/2009

*Primary Examiner* — Grant Moubry
*Assistant Examiner* — James G Moubry
(74) *Attorney, Agent, or Firm* — Bayramoglu Law Offices LLC (57) ABSTRACT

Split-cycle internal combustion engine comprising at least one compressor cylinder and at least one combustion cylinder each associated with a relating piston and a relating head, equipped with at least one admission valve and one exhaust valve of the combustor piston, first controller of the at least one admission valve and second controller of the at least one exhaust valve, the piston of the combustion cylinder is associated with a crankshaft by a crank mechanism and when the engine is in a firing condition the second controller is arranged to cause a first opening event of the at least one exhaust valve in a first predetermined angular position of the crankshaft and when the engine is in the engine braking condition the second controller is arranged to reposition the first event in a second predetermined angular position out of phase by 180 degrees with respect to the first angular position.

18 Claims, 5 Drawing Sheets

(51) Int. Cl.
   *F02B 75/02* (2006.01)
   *F02D 13/02* (2006.01)
   *F02D 13/04* (2006.01)

(52) U.S. Cl.
   CPC .......... *F02B 75/02* (2013.01); *F02D 13/0207* (2013.01); *F02D 13/04* (2013.01); *F02B 2075/025* (2013.01)

(58) Field of Classification Search
   CPC ........... F02B 2075/025; F02D 13/0207; F02D 13/04; F02D 41/008; F01L 13/06; Y02T 10/12
   See application file for complete search history.

(56) References Cited

U.S. PATENT DOCUMENTS

| | | | |
|---|---|---|---|
| 9,091,201 B1 | 7/2015 | Kristani | |
| 2010/0186390 A1* | 7/2010 | Perry | .................... F01N 3/2073 |
| | | | 123/698 |
| 2011/0303185 A1 | 12/2011 | Zajac | |

* cited by examiner

SPLIT CYCLE INTERNAL COMBUSTION ENGINE

CROSS REFERENCES OF THE RELATED APPLICATIONS

This application is the national phase entry of International Application No. PCT/IB2021/057050, filed on Aug. 2, 2021, which is based upon and claims priority to Patent Applications No. IT 102020000020140, filed on Aug. 13, 2020, the entire contents of which are incorporated herein by reference.

TECHNICAL FIELD

The present invention relates to the field of split cycle internal combustion engines and in particular to their use in engine brake to brake the related vehicle.

BACKGROUND

In the field of industrial diesel cycle internal combustion engines, the use of the engine, through modifications to the valve actuation, is known as an auxiliary braking system of the vehicle (Engine brake) in order not to strain the main braking system, especially in commercial vehicles having a high mass.

This engine brake function is particularly useful as it is a valid alternative to the activation of auxiliary braking systems (Hydraulic or Electric parasitic current) which have the defect of absorbing parasitic energy even when not in use.

Also known in the state of the art are split cycle engines wherein the operating cycle is divided between a plurality of cylinders, usually two. Indicatively, the subdivision assigns the admission and compression functions to the first cylinder and the combustion, expansion and exhaust functions to the second cylinder.

It is evident that both the compressor cylinder and the combustion cylinder work in two stages. In particular, a combustion/expansion phase occurs whenever the piston of the combustion cylinder moves from its top dead center to its bottom dead center.

Therefore, the at least two cylinders operate on an overall cycle which is a thermodynamic cycle that can coincide with any of the known thermodynamic cycles Otto, Diesel, Sabatè etc . . . or can present more or less significant variants in which, for example, intermediate heat exchanges are foreseen between the phases.

EP2131023 shows the implementation of the motor brake in split-cycle motors.

EP2131023 shows a solution according to which the compressor cylinder is connected to the combustion cylinder by means of an accumulation tank. Between the storage tank and the combustion cylinder there are two valves, a crossover valve and a control valve.

Furthermore, EP2131023 discloses the fact that under engine brake conditions, the control valve is kept stably closed. The combustion cylinder can withdraw and recompress air into the tank or the combustion cylinder can suck and release air from/into the exhaust duct.

In other words, according to EP2131023 the source and discharge of the pumped air are always coincident.

If not specifically excluded in the detailed description that follows, what is described in this chapter is to be considered as an integral part of the detailed description.

SUMMARY

The object of the present invention is to present a valve opening scheme and its variants such as to allow a vehicle to brake by means of a split-cycle engine, taking into account the particularities of the engine itself.

The basic idea of the present invention is to anticipate the opening of the exhaust valve by about 180° with respect to the normal operating condition, while the admission valve continues to introduce fresh air into the combustion cylinder.

Generally, the normal operating condition is indicated as "firing", i.e. when the fuel injection system is active in order to allow the engine to produce positive torque.

Conversely, the condition of the engine brake is generally indicated with "engine brake" and, while the fuel injection system is deactivated or inhibited, the engine produces negative torque useful to brake the related vehicle.

Therefore, the object of the present invention is to modify the valve lift law of the combustion cylinder, so as to enable the engine brake function in a split-cycle engine.

Another object obtained by means of preferred variants of the present invention is that of maximizing also the negative work performed by the compressor cylinder. Thus, the negative work of the compressor cylinder is added to the negative work of the combustion cylinder operated in engine brake mode, optimizing the braking power of the engine as a whole.

Unlike EP2131023, in the engine brake condition there is cooperation between the compressor cylinder and the combustion cylinder, since the compressed air from the compressor cylinder passes through the combustion cylinder reaching directly the exhaust line.

This ensures that the air coming from the compressor cylinder is discharged before any positive work can be carried out during the expansion of the combustion cylinder.

Therefore, the "combustion cylinder" system cooperates with the compressor cylinder in the braking operation of the compressor cylinder itself.

This effect, that is the continuous flow of fresh air from the admission to the exhaust, is not only favourable to the braking power, but also and above all to the reliability of the engine, such that is one of the enabling elements of the same technology. As the person skilled in the art is well aware, the braking power absorbed by the engine, due to the well-known and elementary laws of physics, is transformed into heat, heat which is evacuated in a minor part in the cooling circuit of the engine and in the majority in the flow itself of the gases passing through the engine. The lack of this constant flow of air which, initially cold sucked and brought by compression even at 700° C., evacuates the thermal power and leads the engine head to operate beyond its structural limits in a few seconds.

In particular, often the bottleneck of the system is represented by the TIP of the injector which must not exceed 450° C., otherwise the material will distort which would then result in altered injections under the thrust of 2000 and more bars of diesel pressure.

As will become clear in the following detailed description, some variants aim at optimizing the braking power taking into account certain constraints characteristic of split-cycle engines, which cannot be found in traditional Diesel/Otto engines.

More specifically, according to some variants of the invention, the aim is exclusively to neutralize the presence of the combustion cylinder, meaning that the braking contribution is given only by the compressor cylinder. According to other variants, however, the combustion cylinder, in addition to cooperating with the compressor cylinder, is made to work as a compressor cylinder allowing the admission of air from the exhaust line during the movement of the relating piston towards its lower dead center.

This air sucked in by the exhaust line is the same air discharged from the compressor cylinder directly into the discharge line.

By traditional engines we mean those engines wherein each cylinder performs all the phases of the related thermodynamic cycle, while the present invention is exclusively aimed at split-cycle engines, wherein each cylinder performs only some phases of the thermodynamic cycle.

The dependent claims describe preferred variants of the invention, forming an integral part of this description.

BRIEF DESCRIPTION OF THE DRAWINGS

Further objects and advantages of the present invention will become clear from the following detailed description of an example of embodiment of the same (and its variants) and from the attached drawings given purely for explanatory and non-limiting purposes, in which.

The diagrams are drawn with the angular position "Crank angle" on the abscissa axis and with the "Lift" opening on the ordinate axis.

The same reference numbers and letters in the figures identify the same elements or components or functions.

In the context of this description, the term "second" component does not imply the presence of a "first" component. These terms are in fact used as labels to improve clarity and should not be understood in a limiting way.

The elements and features illustrated in the various preferred embodiments, including the drawings, can be combined with each other without however departing from the scope of this application as described below.

DETAILED DESCRIPTION OF THE EMBODIMENTS

Figure 1:
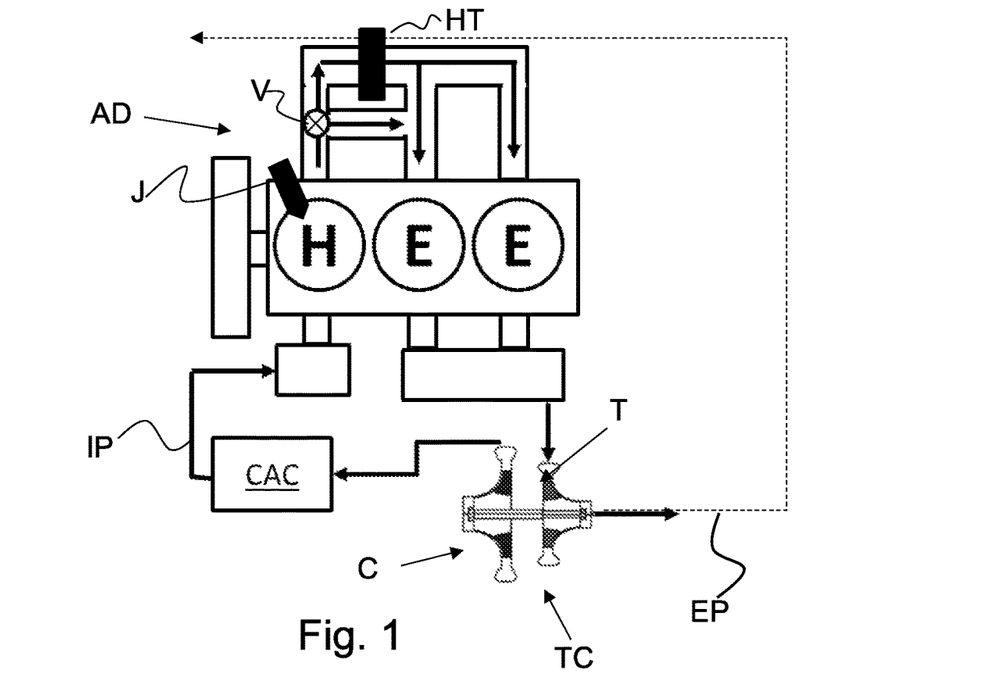
FIG. 1 shows an example of a modified split-cycle engine according to the present invention.

With reference to FIG. 1, an example of a split-cycle internal combustion engine M is shown, the operating principle of which is known per se.

Two cylinders E are shown, where combustion/expansion/exhaust takes place and a compressor cylinder H, where suction and compression take place.

For convenience, we refer to the combustion cylinder E and the compressor cylinder H below.

According to some schemes (not shown) there is a compressor cylinder for each combustion cylinder. This is not relevant for the purposes of the present invention.

Similarly, the at least one combustion cylinder can be associated with a separate and distinct crankshaft from the crankshaft associated with the compressor cylinder. For example, the crankshaft associated with the compressor cylinder can be driven by a cascade of gears from the crankshaft associated with at least one combustion cylinder. This fact allows to increase the compressed air flow rate generated by the compressor cylinder to the point of using a single compressor cylinder for several combustion cylinders, as shown in FIG. 1.

It is evident that these modifications are within the tasks of the person skilled in the art and in any case are not relevant for the purposes of the present invention.

It is necessary to point out that there is no form of accumulation of compressed air, therefore, there is no tank interposed between the compressor cylinder and the relating combustion cylinder. In addition, the sole valve that separates the combustion cylinder from its combustion cylinder is an inlet valve.

What matters, for the purposes of the present invention, is that the combustion cylinder performs a two-stroke cycle, that is to say that it performs a combustion/expansion every time the relating piston moves from the relating top dead center to the relating lower dead center.

The compressor cylinder H is preferably supercharged by a turbocharger TC having a compressor C driven in rotation by a turbine T arranged on the exhaust line EP of the engine M.

The fresh air drawn in from the external environment is compressed by the compressor C of the turbocharger in the admission duct IP of the heat engine M.

A cooler CAC is preferably arranged on the admission duct IP to cool the compressed air from the turbocharger that enters the compressor cylinder.

The compressor cylinder feeds at least one of the combustion cylinders E. In this case, it feeds two combustion cylinder s through a compressed air distribution duct AD.

According to a preferred variant of the invention, a heat exchanger HT is arranged on the distribution duct which has the purpose of heating the compressed air circulating in the distribution duct at the expense of the thermal content of the exhaust gases circulating in the upstream exhaust line EP or preferably downstream of the turbine T. The portion of the exhaust line EP is shown in broken lines.

Preferably, a valve V is arranged to bypass the heat exchanger when the engine is operating in engine braking, i.e. in engine braking, vice versa, when the engine is firing, the air distributed to the combustion cylinder s E is heated through the heat exchanger. HT.

The heating of the air in firing is particularly necessary as to save compression work when an injector of suitable refrigerant fluid is preferably provided in the compressor cylinder H, injector indicated in FIG. 1 with the symbol INJ.

Figure 2:
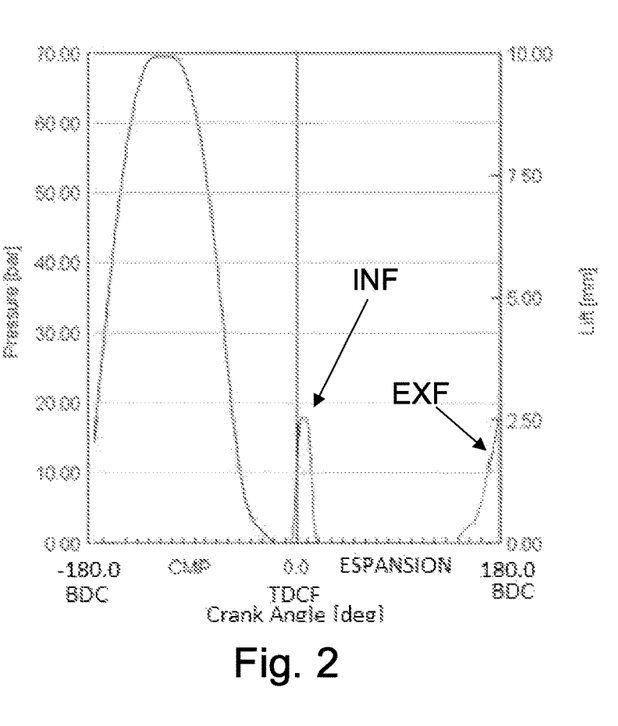
FIG. 2 shows a phase diagram related to the intake/combustion and exhaust events of a split-cycle engine in firing mode.

FIG. 2 shows a phase diagram of the admission and exhaust valves (not shown) of the combustion cylinder.

The admission valve is arranged to allow the passage of compressed air from the compressor cylinder into the corresponding combustion cylinder, while the exhaust valve is arranged to allow the exhaust gases to be discharged into the exhaust line EP.

FIG. 2 shows a phase (or angular) diagram related to the events concerning the combustion cylinder E.

Two events are reported: admission INF and exhaust EXF; the first starts at about −10 degrees, i.e. 10 degrees before the 0.0 phase corresponding to the TDCF top dead center, and ends at about +20 degrees. The event EXF begins around 150 degrees and ends at around 340 degrees, which is −20 degrees compared to the next TDCF.

Therefore, the cyclical nature of the combustion cylinder alone is 360 degrees as for example in a two-stroke engine.

The event INF corresponds to the opening of the admission valve of compressed air from the compressor cylinder, while the second event corresponds to the opening of the exhaust valve which connects the combustion chamber of the combustion cylinder with the exhaust line EP. It is evident that with this admission valve opening diagram, the compressed air from compressor cylinder H is fed through the admission valve into the combustion cylinder E across the TDCF (Top Dead Center) and performs a positive job of expansion on the piston of the combustion cylinder E approximately equal to the negative one absorbed by the piston of the compressor cylinder H due to its compression. In the abbreviation TDCF, the last letter "F" indicates that it is the combustion cylinder, as F stands for "firing" that is combustion. This letter distinguishes, in FIG. 2, the opening lobe of the exhaust valve in combustion conditions.

FIGS. 3-8 show angular phase diagrams or simply "angular", related to the opening of the inlet and/or exhaust valves of the combustion cylinder according to the present invention.

According to the present invention, when the engine is in engine brake mode, the exhaust valve anticipates its opening by approximately 180 degrees. If the opening angle of the exhaust valve is comparable to the opening angle of the admission valve in combustion conditions, or rather slightly greater, the combustion cylinder is neutral, that is to say, it moves between the relating dead point top and bottom dead center without contributing to engine braking. This implies that the braking effect is given only by at least one compressor cylinder.

Instead, when the angular amplitude of opening of the exhaust valve widens, this allows the admission of air from the exhaust line, during the movement of the combustor piston from its upper dead center to its lower dead center, while all the valves, both inlet and exhaust are closed during the opposite movement to the previous one, from the bottom dead center BDCF to the top dead center TDCF, determining the compression of the fluid admitted in the previous phase. Therefore, the combustion cylinder works like a compressor cylinder. The opening of the exhaust valve before the TDCF determines to instantaneously dissipate the compression work just performed by the combustion cylinder itself, releasing the air trapped in the combustion cylinder chamber towards the exhaust line, before it can return, in the expansion phase, the energy stored in the relating compression phase.

In these operating conditions, both the compressor cylinder and the combustion cylinder contribute to the braking of the engine.

The subsequent opening of the admission valve straddling the TDCF, as occurs during the firing phase, is carried out at a time when the volume of the cylinder is practically limited to the dead volume only. This also means that the air coming from the compressor cylinder is discharged directly to the exhaust line without being able to carry out positive work during the expansion of the combustion cylinder.

The partial overlap of the opening of the exhaust valve with the opening of the inlet valve, with a certain advance of opening of the exhaust valve with respect to the opening of the inlet valve, entails a significant technical effect, namely washing with cold air coming from the compressor cylinder of the combustion cylinder chamber.

In such circumstances, the bypass of the heat exchanger HT and the possible controlled injection of the refrigerant fluid into the compressor cylinder allows to keep the temperature of the air that washes the combustion chamber sufficiently low.

Figure 3:
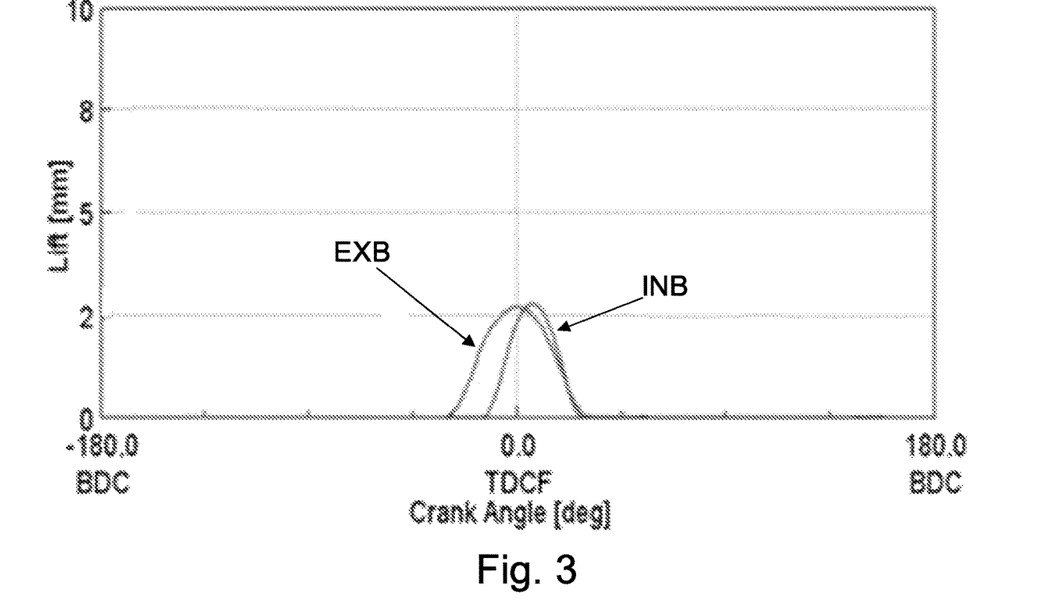
FIGS. 3, 5 show modified phase diagrams according to examples of the present invention, wherein a modification involves only the exhaust valve(s)

FIG. 3 shows a first implementation example, wherein the opening diagram of the exhaust valve EXB has an amplitude of about 60 degrees with a peak centered on phase 0.0. The opening event of the inlet valve, according to this variant of the invention, remains unchanged with respect to the firing condition shown in FIG. 2.

It should be noted that the opening event of the exhaust valve is marked with the letter "B" of EX<u>B</u> to indicate the "braking" condition of the engine.

It is also noted that according to the variant in FIG. 3, the lift in millimeters of the inlet and exhaust valves is comparable (about 2.5 mm).

Figure 4:
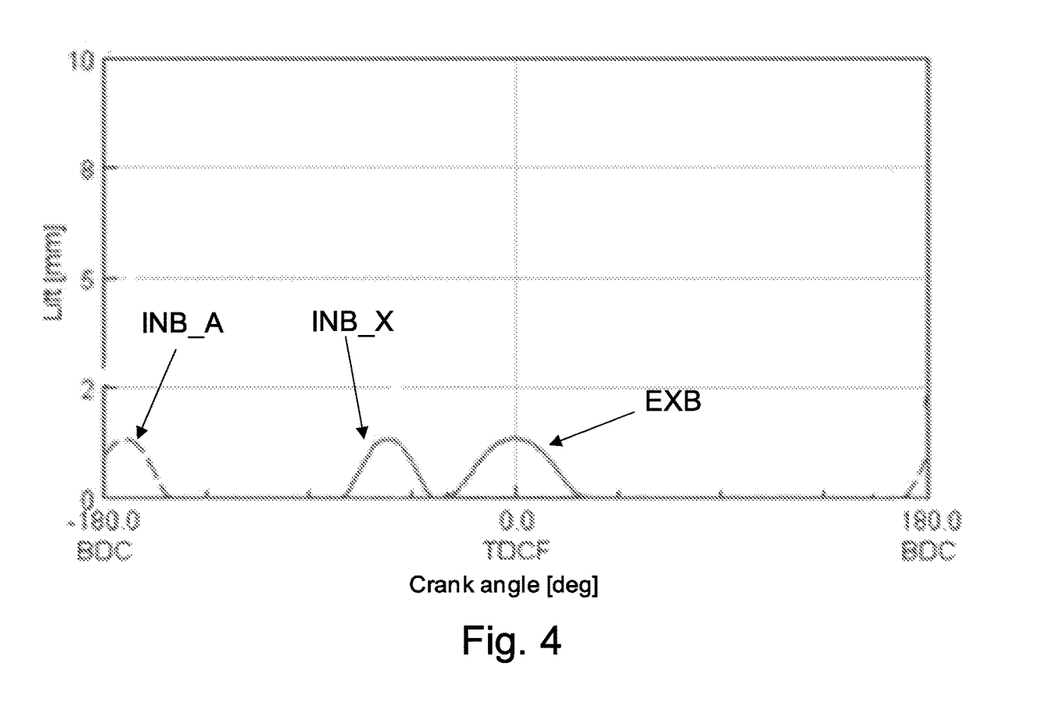
FIGS. 4, 6-9 show modified phase diagrams according to examples of the present invention, wherein a modification involves taken both the opening timing of the exhaust valve(s) and of the inlet valve(s).

FIG. 4 shows a variant according to which also the timing of the admission valve undergoes a variation with respect to the firing condition. In particular, in FIG. 4, keeping the timing of the opening EXB of the exhaust valve unchanged compared to FIG. 3, the opening of the admission valve is anticipated in an angular interval limited negatively by the event INB_A. In particular, the opening event of the admission valve can go from the situation shown in FIG. 3 to the end INB_A shown in FIG. 4.

INB_X represents an intermediate position that can be fixed or adjustable in relation to the valve opening actuation system.

The extreme INB_A is out of phase in advance of about 180 degrees with respect to the reference angular position 0.0. According to the condition wherein the opening peak of the admission valve is almost −170 (INB_A), a greater compression work is obtained in the combustion cylinder compared to the condition wherein the peak is close to phase 0.0. This increase in the compression work, however, leads to a significant increase in temperatures in the combustion cylinder, also due to the failure to wash the relating dead volume, described above. For these reasons, the opening of the admission valve can be anticipated by moving towards INB_A but taking into account the thermal constraints of the motor.

Figure 5:
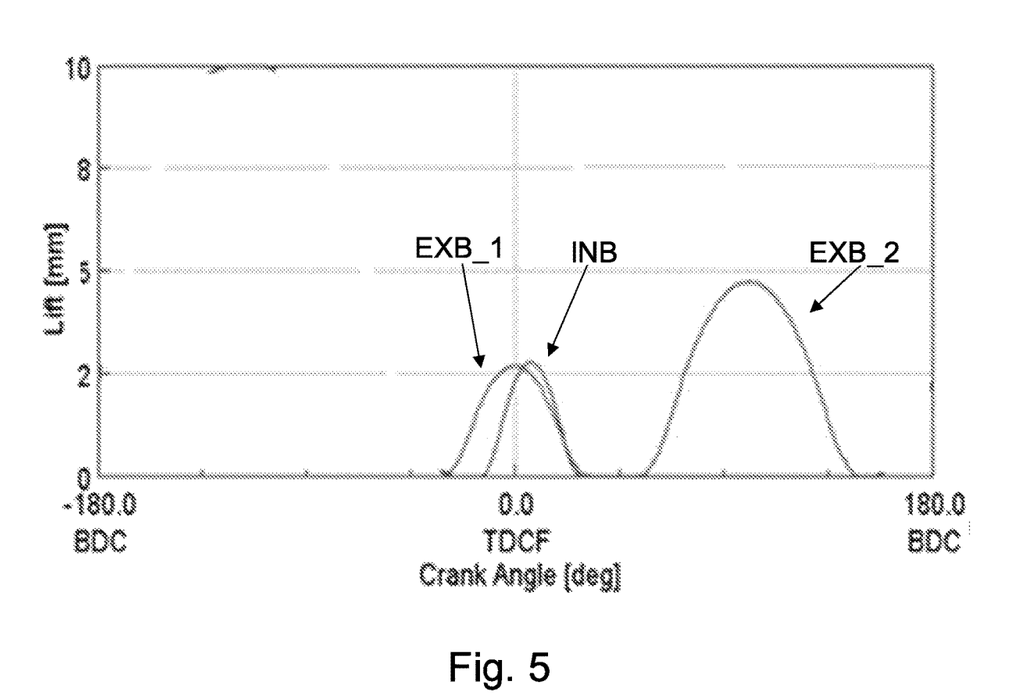

In FIG. 5, beyond the positioning of the opening peak INB of the inlet valve, there is a first discharge event EXB_1 similar to that of FIGS. 3 and 4, to which a second discharge event EXB_2 is added with a peak positioned at about 90 degrees with reference to phase 0.0 on which the first EXB_1 peak is centered. During the first opening event EXB_1 of the exhaust valve, the combustion cylinder is washed, as described with reference to FIG. 3.

Another relevant technical effect of the chosen timing is that with the first event EXB_1, the cold air is the last discharged towards the exhaust line, and with the EXB_2 event this cold air is the first air flow to be re-admitted into the combustion cylinder from the exhaust line during the movement of the piston towards the bottom dead center BDC (Bottom Dead Center).

This transit of fresh air from the exhaust line allows the combustion cylinder to be cooled, and in particular allows the temperature of the head, the valves and the "TIP" nozzle of the injector to be kept within the structural limits.

Figure 6:
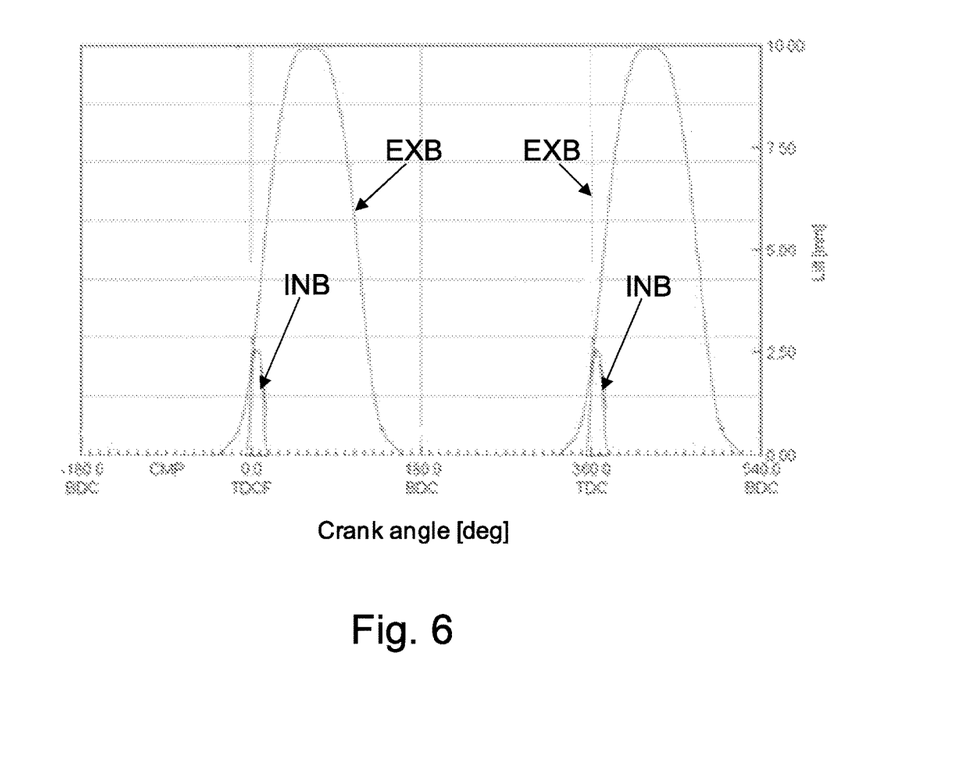

FIG. 6 shows a further evolution of the solution of FIG. 5 with further benefits. In particular, instead of having two distinct opening events of the exhaust valve, there is a single event for each cycle of 360°, of angular amplitude equal to the typical opening of when the engine is in firing condition, but evidently, the opening event of the exhaust valve EX is anticipated by about 180 degrees compared to what is shown in FIG. 2.

This solution is particularly advantageous because it is possible to obtain this variation by means of an inexpensive phase variator rather than a complex system for varying the timing by means of auxiliary lobes, etc. Generally, the activation of auxiliary lobes is referred to as "added movement".

When a phase variator is implemented, it is noted that not only the angular amplitude of the discharge event is unchanged with respect to the corresponding event in the firing mode, but also the lift in millimeters is unchanged, this advantageously allows to obtain an optimal filling of the combustion cylinder.

Figure 7:
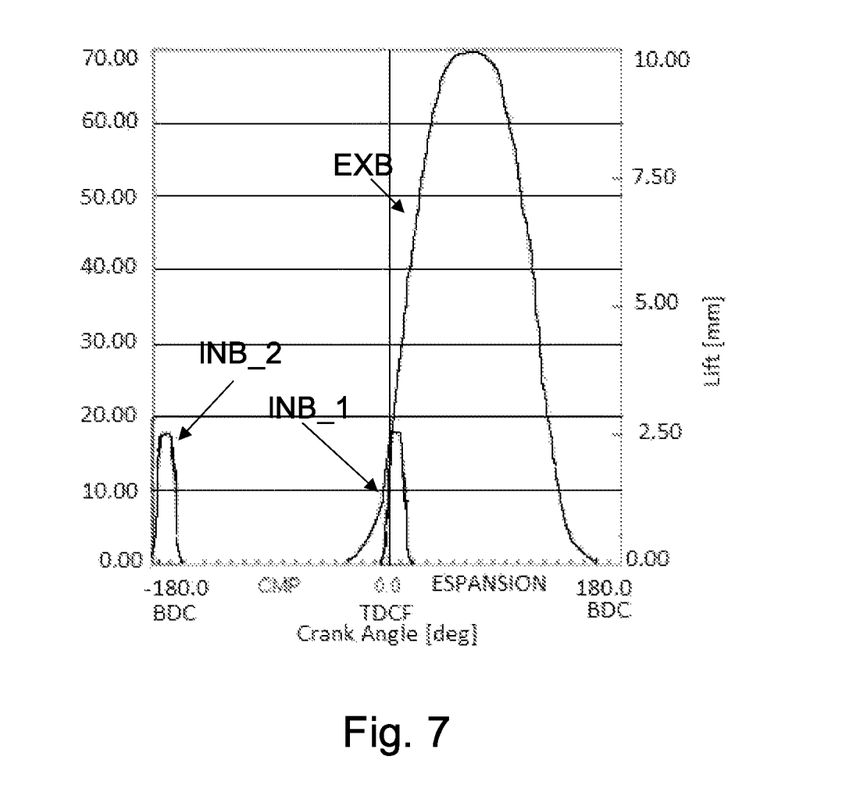

FIG. 7 shows a further variant of the present invention based on the diagram of FIG. 6.

According to FIG. 7, we intervene on the timing of both the exhaust valve by anticipating it by 180°, leaving unchanged both the angular amplitude and the lift in millimeters of the exhaust event, but we also intervene on the timing of the admission valve with two distinct events INB_1 and INB_2.

Basically, INB_1 corresponds to INF of FIG. 2 and INB of FIGS. 3, 5 and 6.

With regard to the admission of the compressed air from the compressor cylinder, it is understood that while in FIG. 4 INB_A indicates an end of an interval, where a single admission event is arranged, according to FIG. 7 these are two distinct events, wherein the second event INB_2 can be shifted in the same interval with end limit INB_A of FIG. 4, while the first event INB_1 remains substantially unchanged with respect to the firing condition shown in FIG. 2.

This solution is particularly advantageous for several reasons. First, the so-called "added motion" is implemented only on the admission valve, with the simple addition of a further admission INB_2 event that can have a lower or greater lift in millimeters than the first admission event INB_1. On the other hand, the timing variation of the exhaust valve takes place, as in FIG. 6, by means of a phase variator. Therefore, variations on both the admission valve and the exhaust valve are achieved by a single "added movement". Two "added motions" are difficult to implement due to the limited space available in the motor head.

From the point of view of engine operation, the second admission INB_2 event allows the compression work to be increased as the piston moves from bottom dead center to top dead center. The first admission event INB_1, on the other hand, performs the aforementioned cooling function of the combustion cylinder with the advantages described above.

Therefore, a distribution of the air flows introduced into the combustion cylinder can be achieved taking into account the thermal constraints of the engine.

Figure 8:
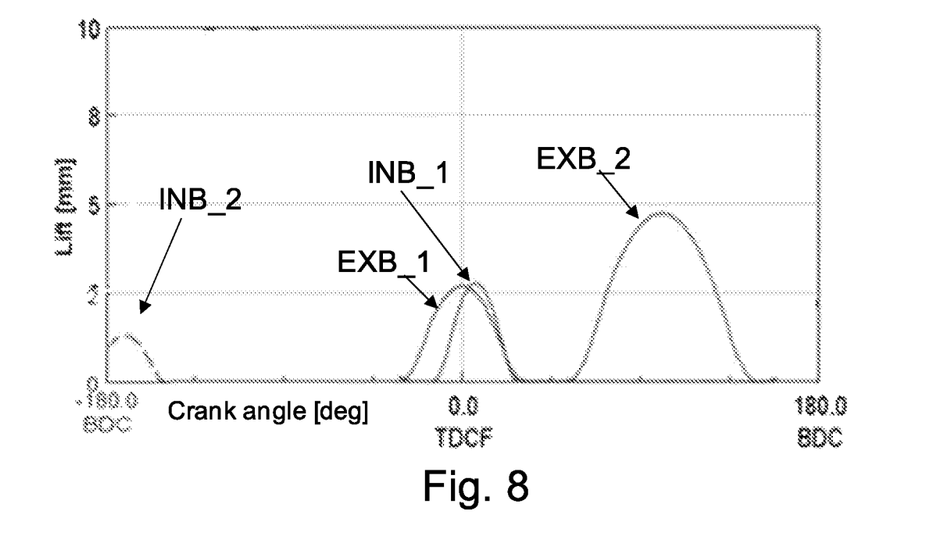

FIG. 8 is a combination between the solution of FIG. 7, relating to the admission events, and FIG. 5, relating to the exhaust events. This implies having to use an "added motion" both on the camshaft that controls the exhaust valve(s) and on the camshaft that controls the admission valve(s).

Figure 9:
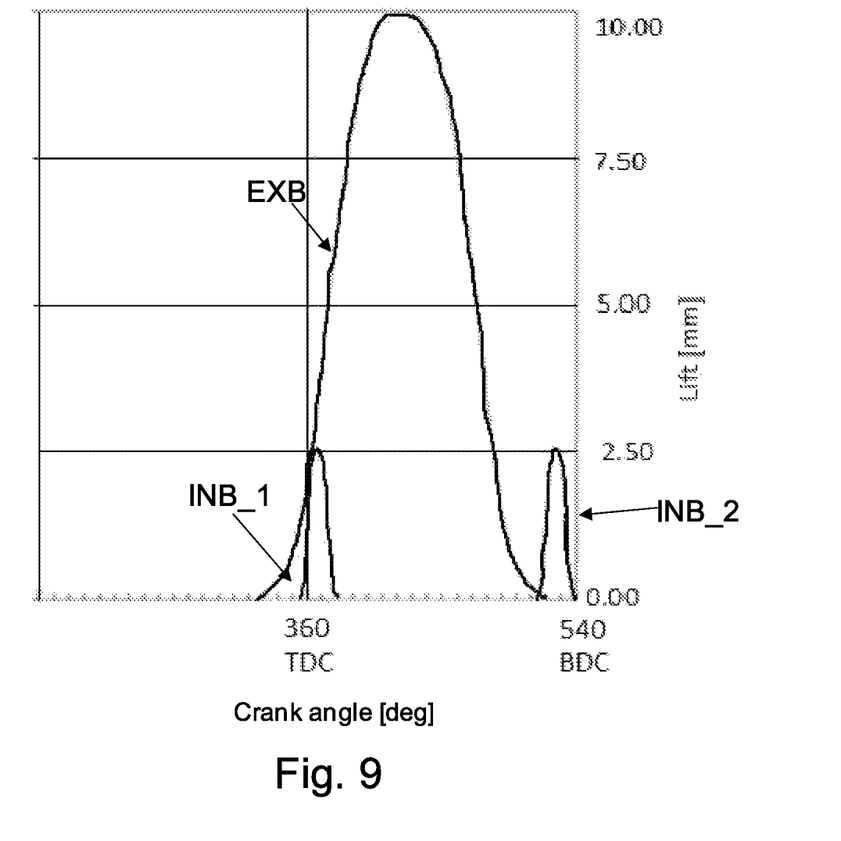

The proposed configurations listed by increasing complexity are reviewed below:

1) Phase variator associated only with the camshaft related to the exhaust; this variant is particularly cheap and offers relatively low braking power, but allows for an adjustment of the positioning of the exhaust event, on which the maximum pressure reached at the end of compression depends, which can take into account thermal conditions of the engine and/or the related exhaust gas post-treatment device;
2) Added motion arranged only on the camshaft relating to the exhaust; this variant allows greater braking power, but is more expensive and does not allow adjustments;
3) A phase variator associated with admission and another phase variator associated with the exhaust; this variant is very simple and cheap and allows to obtain high braking power. The power is adjustable by adjusting the final position of the variators, even if a corresponding increase in temperature and pressure in the combustion cylinder is associated with the increase in braking power; in FIG. 9 wherein it can be seen that both the admission and exhaust events, in order to obtain the maximum braking power, are anticipated by approximately 180 with respect to the condition of FIG. 2;
4) A phase variator associated with the exhaust and an added motion associated with admission (FIG. 7); this variant allows greater gradual intervention, by first activating the phase variator and then the added motion, a lower braking power is obtained than solution 3), but allows greater control of the temperature and pressure on the combustion cylinder;
5) An added motion associated with the admission and an added motion associated with the exhaust (FIG. 8); this variant is the most expensive and complex, but offers the best compromise between power and technological limitations of the engine.
6) An added motion and a phase variator for each valve (combination of FIGS. 4 and 5 or 7 and 5).

As described above, the solution of FIG. 3, with a limited angular opening of the exhaust valve, leads to neutralizing the behavior of the combustion cylinder. Instead, the solutions of FIGS. 4-8 allow the admission of air from the exhaust line by transforming the combustion cylinder into a compressor cylinder.

Implementation variants of the described non-limiting example are possible, without however departing from the scope of protection of the present invention, including all the equivalent embodiments for a person skilled in the art, to the content of the claims.

From the above description, the person skilled in the art is able to realize the object of the invention without introducing further construction details.

What is claimed is:

1. A split cycle type internal combustion engine comprising
   at least one combustion cylinder associated with a relating piston and a relating head, equipped with at least one admission valve and an exhaust valve,
   at least one compressor cylinder associated to a relating piston and a relating head and arranged to feed the combustion cylinder with compressed air through said admission valve,
   first control means of said at least one admission valve and
   second control means of said at least one exhaust valve,
   wherein the piston of the combustion cylinder is associated with a crankshaft by means of a crank mechanism so that the combustion cylinder performs a two-strokes cycle and wherein
   when the engine is in a firing condition, said second control means are arranged to cause a first opening event of the at least one exhaust valve in a first predetermined angular position of the crankshaft and wherein
   when the engine is in engine braking condition, said second control means are arranged to move said first event into a second predetermined angular position (EXB, EXB_1) out of phase by about 180 degrees with respect to said first angular position and said first control means are arranged to generate a first opening event of the admission valve approximately at a crankshaft angular reference position (0.0) in which the piston of the combustion cylinder is at a relating top dead center.

2. The Engine according to claim 1, wherein said second angular position is out of phase by about 180 degrees in advance of said first angular position.

3. The Engine according to claim 1, wherein said first opening event (EXB, EXB_1) has an angular amplitude of about 60 degrees with a peak centered on the second predetermined angular position corresponding to the top dead center of the piston of the combustion cylinder, so that a braking power generated by the engine is determined exclusively by the compressor cylinder.

4. The Engine according to claim 3, wherein said second control means are arranged, in motor brake conditions, to generate a second opening event delayed with respect to the first event by about 90 degrees, allowing admission of air from the exhaust valve so that the combustion cylinder functions as a compressor cylinder.

5. The Engine according to claim 4, wherein a lift of the at least one exhaust valve is greater in said second event than in the first event.

6. The Engine according to claim 4, wherein said second control means of the at least one exhaust valve comprises an "added motion".

7. The Engine according to claim 1, wherein said first event in said second predetermined angular position has an opening width and lift of the at least one exhaust valve equal, respectively, to the opening and lift amplitude of an ejection event in the combustion condition, allowing admission of air from the exhaust valve so that the combustion cylinder functions as a compressor cylinder.

8. The Engine according claim 1, wherein in conditions of engine brake, said first control means of at least one inlet valve, are arranged to generate a first opening event with an angular opening of about 40-50 degrees with a relating peak about 10 degrees delayed from an angular position of the crankshaft corresponding to the crankshaft angular reference position (0.0) where the combustion cylinder piston is at its top dead center.

9. The Engine according to claim 8, wherein said first opening event of the at least one admission valve is kept unchanged in the engine brake condition or is moved in advance, within an angular interval [INB_A; INB], and wherein a first extreme is 180 degrees out of phase with respect to the crankshaft angular reference position (0.0) of the engine in combustion condition.

10. The Engine according to claim 9, wherein said first control means of the at least one admission valve comprises a phase variator or an "added motion".

11. The Engine according to claim 8, wherein said first control means of said at least one admission valve are arranged to generate a first opening event unchanged with respect to the combustion condition and a second opening event 180 degrees out of phase in advance of the first admission valve opening event.

12. The Engine according to claim 1, wherein said second control means of the at least one exhaust valve comprises a phase variator.

13. The Engine according to claim 1, wherein the compressor cylinder supplies at least one of the combustion cylinders by means of a compressed air distribution duct on which a heat exchanger is arranged to acquire heat from gas expelled from the compressor cylinder.

14. The Engine according to claim 13, wherein said distribution duct comprises bypass means for bypassing the heat exchanger at least when the engine is operated in engine brake conditions and preferably only when the engine is operated in engine brake conditions.

15. The Engine according to claim 1, further comprising means for injecting a refrigerant fluid into the compressor cylinder under combustion conditions and configured to vary a flow rate of refrigerant fluid under engine brake conditions as at least one of:
- a function of a temperature of a component of the combustion cylinder, the component including at one of a flame plate or injector; or
- as a function of the temperature of exhaust gases expelled from the combustion cylinder.

16. A method for operating an engine brake by means of a split cycle internal combustion engine comprising at least one combustion cylinder associated with a relating piston and a relating head, equipped with at least one admission valve and an exhaust valve, at least one compressor cylinder associated with a relating piston and a relating head and arranged to supply the combustion cylinder with compressed air through the at least one admission valve, first control means for said at least one admission valve and second control means for said at least one exhaust valve, wherein the piston of the combustion cylinder is associated with a crankshaft by means of a crank mechanism and wherein the second control means, when the engine is in firing condition, are arranged to cause a first opening event of the at least one exhaust valve in a first predetermined angular position of the crankshaft, the method including the following steps to operate the engine brake:
- inhibition of fuel injection in said at least one combustion cylinder,
- repositioning of said first event in a second predetermined angular position (EXB, EXB_1) out of phase by about 180 degrees with respect to said first angular position.

17. A computer program comprising program coding means adapted to carry out all the steps according to claim 16, when said program is run on a computer.

18. A computer readable means comprising a recorded program, said computer readable means comprising program coding means adapted to perform all the steps according to claim 16, when said program is run on a computer.

* * * * *